(No Model.)

W. H. DODGE.
SCYTHE HANDLE.

No. 436,220. Patented Sept. 9, 1890.

Witnesses
Wm. S. Hodges
D. A. Millrick

Inventor
William H. Dodge
By Patrick O'Farrell
Attorney.

UNITED STATES PATENT OFFICE.

WILLIAM H. DODGE, OF LENOX, MASSACHUSETTS.

SCYTHE-HANDLE.

SPECIFICATION forming part of Letters Patent No. 436,220, dated September 9, 1890.

Application filed May 12, 1890. Serial No. 351,414. (No model.)

*To all whom it may concern:*

Be it known that I, WILLIAM H. DODGE, a citizen of the United States of America, residing at Lenox, in the county of Berkshire and State of Massachusetts, have invented certain new and useful Improvements in Scythe Tholes or Handles, of which the following is a specification, reference being had therein to the accompanying drawings.

This invention pertains to certain new and useful improvements in scythe tholes or handles, having for its object the provision of new and improved means for preventing the rubbing of or friction on the hands of the operator.

The invention consists, briefly, of a cylindrical handle adjustably fastened to the shaft or snath of a scythe by means of a threaded rod, substantially as hereinafter fully set forth, and particularly pointed out in the claims.

Figure 1:
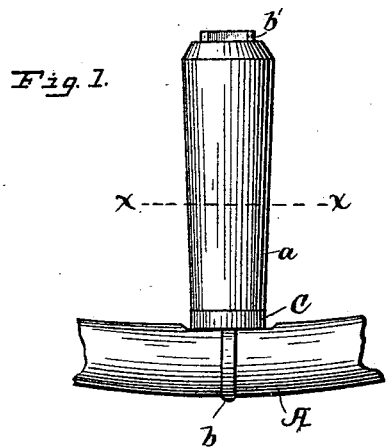
Figure 2:
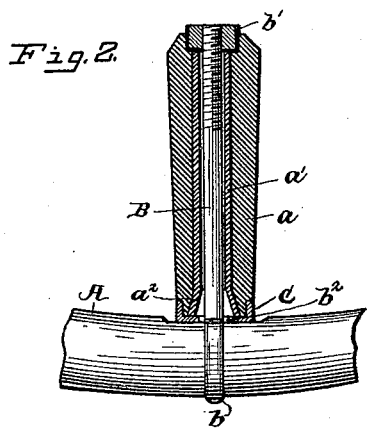
Figure 3:
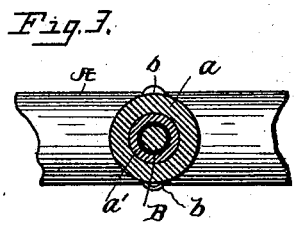

In the accompanying drawings, Figure 1 is a side view of a portion of a scythe-snath with my invention applied thereto. Fig. 2 is a longitudinal sectional view; and Fig. 3 is a view in cross-section on the line $x\ x$, Fig. 1.

Referring to the drawings, A designates the snath or shaft, and $a$ a wooden thole or handle, wherein is secured a tube or cylinder $a'$, having an enlarged or flanged end $a^2$, fitting snugly within a recess in one end of the outer covering of said thole or handle.

B is a threaded rod or bolt having at one end an eye $b$, which encircles and is secured to the snath or shaft A. This rod or bolt is designed to be extended through the tube $a'$ of the thole $a$, and the latter is secured thereon by a nut $b'$.

C is a cap fitted on the inner end of thole or handle $a$ adjacent to the snath. Said cap is provided with a longitudinal slot $b^2$, through which the bolt or rod extends.

In practice, when the operator swings the scythe, the thole or handle remains stationary in the hand of the operator and the rod or bolt freely turns or moves therein with the motion of the scythe.

It will be seen that by means of my invention friction on the hands caused by the motion of the scythe is entirely obviated. The invention is extremely simple, cheap, and durable, and can easily be replaced when worn.

I claim as my invention—

1. The herein-described improvement in scythes, consisting of the thole or handle secured to the snath or shaft so as to be free to revolve, as set forth.

2. The herein-described improvement in scythes, consisting of the snath or shaft having a rod or bolt secured thereto and the thole or handle loosely secured on said rod or bolt, as set forth.

3. The combination, with the snath or shaft, of the threaded rod or bolt secured thereto, the thole or handle having a central hole or opening, the tube or cylinder located therein, and the nut for holding the thole or handle, which latter is loosely secured on said rod or bolt, substantially as set forth.

4. The combination, with the snath or shaft, of the threaded rod or bolt having an eye encircling said snath or shaft, the thole or handle having a central hole or opening, the tube or cylinder located therein, the end cap having a central slot, and the nut screwed on said rod, substantially as set forth, said thole or handle being loose on said rod, as stated In testimony whereof I affix my signature in presence of two witnesses.

WILLIAM H. DODGE.

Witnesses:
GEO. H. TUCHER,
HENRY M. PITT.